(12) United States Patent
Aura et al.

(10) Patent No.: US 8,806,565 B2
(45) Date of Patent: *Aug. 12, 2014

(54) SECURE NETWORK LOCATION AWARENESS

(75) Inventors: Tuomas Aura, Cambridge (GB); Michael Roe, Cambridge (GB); Steven Murdoch, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 891 days.

This patent is subject to a terminal disclaimer.

(21) Appl. No.: 11/854,333

(22) Filed: Sep. 12, 2007

(65) Prior Publication Data

US 2009/0070582 A1 Mar. 12, 2009

(51) Int. Cl.
*H04L 29/06* (2006.01)
*G06F 17/00* (2006.01)
*G06F 7/04* (2006.01)
*G06F 17/30* (2006.01)

(52) U.S. Cl.
USPC ........ 726/1; 726/2; 726/26; 726/30; 713/156; 713/157

(58) Field of Classification Search
USPC .................... 726/1; 713/150, 155, 156, 157
See application file for complete search history.

(56) References Cited

U.S. PATENT DOCUMENTS

| | | | |
|---|---|---|---|
| 5,884,024 A | | 3/1999 | Lim et al. |
| 6,151,676 A * | | 11/2000 | Cuccia et al. ................ 713/176 |
| 6,185,678 B1 | | 2/2001 | Arbaugh et al. |
| 6,275,941 B1 | | 8/2001 | Saito et al. |
| 6,452,925 B1 | | 9/2002 | Sistanizadeh et al. |
| 6,757,825 B1 | | 6/2004 | MacKenzie et al. |
| 6,816,970 B2 | | 11/2004 | Morgan et al. |
| 7,131,006 B1 | | 10/2006 | Carroll |
| 7,568,092 B1 | | 7/2009 | Englund |
| 7,653,746 B2 | | 1/2010 | Touch et al. |
| 7,941,830 B1 * | | 5/2011 | Painter et al. ..................... 726/5 |
| 2002/0076054 A1 | | 6/2002 | Fukutomi et al. |

(Continued)

FOREIGN PATENT DOCUMENTS

WO    WO2005104500    11/2005

OTHER PUBLICATIONS

Protocol:HTTPS (Secure Protocol) © 2006; Colasoft.*

(Continued)

*Primary Examiner* — Luu Pham
*Assistant Examiner* — Jahangir Kabir
(74) *Attorney, Agent, or Firm* — Pablo Tapia; Jim Ross; Micky Minhas

(57) ABSTRACT

Secure network location awareness is provided whereby a client is able to use appropriate settings when communicating with an access node of a communications network. In an embodiment a client receives a signed message from the access node, the signed message comprising at least a certificate chain having a public key. In some embodiments the certificate chain may be only a self-signed certificate and in other embodiments the certificate chain is two or more certificates in length. The client validates the certificate chain and verifies the signature of the signed message. If this is successful the client accesses stored settings for use with the access node. The stored settings are accessed at least using information about the public key. In another embodiment the signed message also comprises a location identifier which is, for example, a domain name system (DNS) suffix of the access node.

20 Claims, 13 Drawing Sheets

(56) References Cited

U.S. PATENT DOCUMENTS

| | | | |
|---|---|---|---|
| 2003/0172144 A1 | 9/2003 | Henry et al. | |
| 2003/0172307 A1 | 9/2003 | Henry et al. | |
| 2003/0200437 A1 | 10/2003 | Oishi | |
| 2005/0050329 A1 | 3/2005 | Wilding et al. | |
| 2005/0071677 A1 | 3/2005 | Khanna et al. | |
| 2005/0086473 A1 | 4/2005 | Barkley et al. | |
| 2005/0100166 A1 | 5/2005 | Smetters et al. | |
| 2005/0114544 A1 | 5/2005 | Chu et al. | |
| 2005/0149723 A1* | 7/2005 | Watkins et al. | 713/156 |
| 2005/0154909 A1 | 7/2005 | Zhang et al. | |
| 2005/0177631 A1 | 8/2005 | Bahl et al. | |
| 2006/0036733 A1 | 2/2006 | Fujimoto et al. | |
| 2006/0047826 A1 | 3/2006 | Cromer et al. | |
| 2006/0155563 A1 | 7/2006 | Banerjee et al. | |
| 2007/0162766 A1* | 7/2007 | Watanabe | 713/193 |
| 2007/0178914 A1 | 8/2007 | Montenegro | |
| 2007/0189255 A1 | 8/2007 | Navali et al. | |
| 2007/0203999 A1 | 8/2007 | Townsley et al. | |
| 2007/0204330 A1 | 8/2007 | Townsley et al. | |
| 2007/0297396 A1 | 12/2007 | Eldar et al. | |
| 2008/0282325 A1 | 11/2008 | Oyama et al. | |

OTHER PUBLICATIONS

Aura et al; Securing Network Location Awareness with Authenticated DHCP; IEEE, 2007.*

Lin et al, An Efficient Mobility Management Mechanism in Hierarchy Mobile IPv6 Networks; IEEE. 2004.*

Ghua et al, An End-Middle-End Approach to Connection Establishment, ACM, Jun. 30, 2007.*

Bahl, et al., "PAWNs: Satisfying the Need for Ubiquitous Secure Connectivity and Location Services", available at least as early as Jul. 2, 2007, at <<http://nms.csail.mit.edu/~aklmiu/pawn/PcsMag01.pdf>>, University of California, San Diego, pp. 10.

Castelluccia, et al., "IPv6 Opportunistic Encryption", INRIA, Oct. 2002, pp. 23.

Cho, et al., "LAAC: A Location-Aware Access Control Protocol", available at least as early as Jul. 2, 2007, at <<http://www.ics.uci.edu/~goodrich/pubs/CholWUAC2006.pdf>>, Department of Computer Science, University of California, pp. 7.

Denning, et al., "Location-Based Authentication: Grounding Cyberspace for Better Security", at <<file:////fvs-olsdat01/home$/nas/Desktop/10816-265%20Documents%20for%20IDS/Location%20Based%20Authentication.txt>>, Elsevier Science Ltd., Feb. 1996, pp. 8.

Droms, "Authentication for DHCP Messages", The Internet Society, Jun. 2001, pp. 17.

Droms, "Dynamic Host Configuration Protocol", Bucknell University, Mar. 1997, pp. 45.

Frankel, et al., "Establishing Wireless Robust Security Networks: A Guide to IEEE 802.11i", National Institute of Standards and Technology, Feb. 2007, pp. 162.

Hancke, et al., "An RFID Distance Bounding Protocol", IEEE, 2005, pp. 7.

Hu, et al., "Packet Leashes: A Defense Against Wormhole Attacks in Wireless Ad Hoc Networks", In Proc IEEE Infocomm, 2003, pp. 15.

"IEEE Computer Society", IEEE Standard 802.11i, Jul. 23, 2004, pp. 190.

"International Telecommunication Union", ITU-T Recommendation X. 509, 2007, pp. 81.

Miu, et al., "Dynamic Host Configuration for Managing Mobility between Public and Private Networks", available at least as early as Jul. 2, 2007, at <<http://delivery,acm.org/10.1145/1260000/1251453/p13-miu.pdf?key1=1251453&key2=7128633811&coll=Portal&dl=GUIDE&CFID=17286036&CFTOKEN=40030580 >>, pp. 12.

Ylonen, "SSH—Secure Login Connections Over the Internet", In Proc 6th USENIX UNIX Security Symposium, Jun. 7, 1996, pp. 7.

Office Action for U.S. Appl. No. 11/854,298, mailed on Dec. 7, 2011, Tuomas Aura, "Improved Dynamic Host Configuration Protocol", 14 pgs.

Final Office Action from the United States Patent and Trademark Office dated Mar. 2, 2011 for U.S. Appl. No. 11/854,298, 15 pgs.

* cited by examiner

SECURE NETWORK LOCATION AWARENESS

BACKGROUND

Network location awareness (NLA) refers to the ability of a computer or other communications network node to recognize or identify a communications network to which it is connected. For example, network location awareness enables mobile computers to recognize home, work and public networks and wireless hotspots and as a result the mobile computer is able to behave differently depending on which network it is participating in. The mobile computer may use the network information to change settings such as firewall rules, or other parameters.

Unfortunately, some existing network location awareness technology is insecure. For example, in some situations, adversaries are able to cause a computer to believe that it is at a private network and so cause it to use weak security settings, such as opening vulnerable ports at a host firewall. Thus there exists a need to improve security whilst keeping costs down and minimizing the need for adaptations to be made to existing communications network equipment and protocols.

The invention is not intended to be limited to implementations that solve any or all of the above mentioned problems.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Secure network location awareness is provided whereby a client is able to use appropriate settings when communicating with an access node of a communications network. In an embodiment a client receives a signed message from the access node, the signed message comprising at least a public key or a certificate chain having a public key, and a freshness indicator such as a nonce. In some embodiments the certificate chain may be only a self-signed certificate and in other embodiments the certificate chain is two or more certificates in length. The client validates the certificate chain, validates the freshness indicator and verifies the signature of the signed message. If this is successful the client accesses stored settings for use with the access node. The stored settings are accessed at least using information about the public key. In another embodiment the signed message also comprises a location identifier which is, for example, a domain name system (DNS) suffix of the access node.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Figure 1:
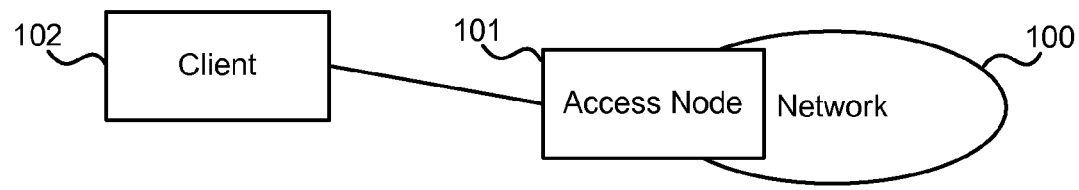
FIG. 1 is a schematic diagram of a client in communication with a communications network via an access node.

FIG. 1 is a schematic diagram of a client 102 such as a laptop computer, personal computer, personal digital assistant or any other computer able to connect to a communications network 100 via an access node 101. The communications network is of any type such as an Intranet, the Internet, wire Ethernet network, a cellular network or other communications network. The access node is any node of the communications network 100 which provides functionality to enable the client 102 to connect to the network 100. The client 102 requires to recognize or identify the network 100 in a network location awareness process such as that now described with reference to FIG. 2.

Figure 2:
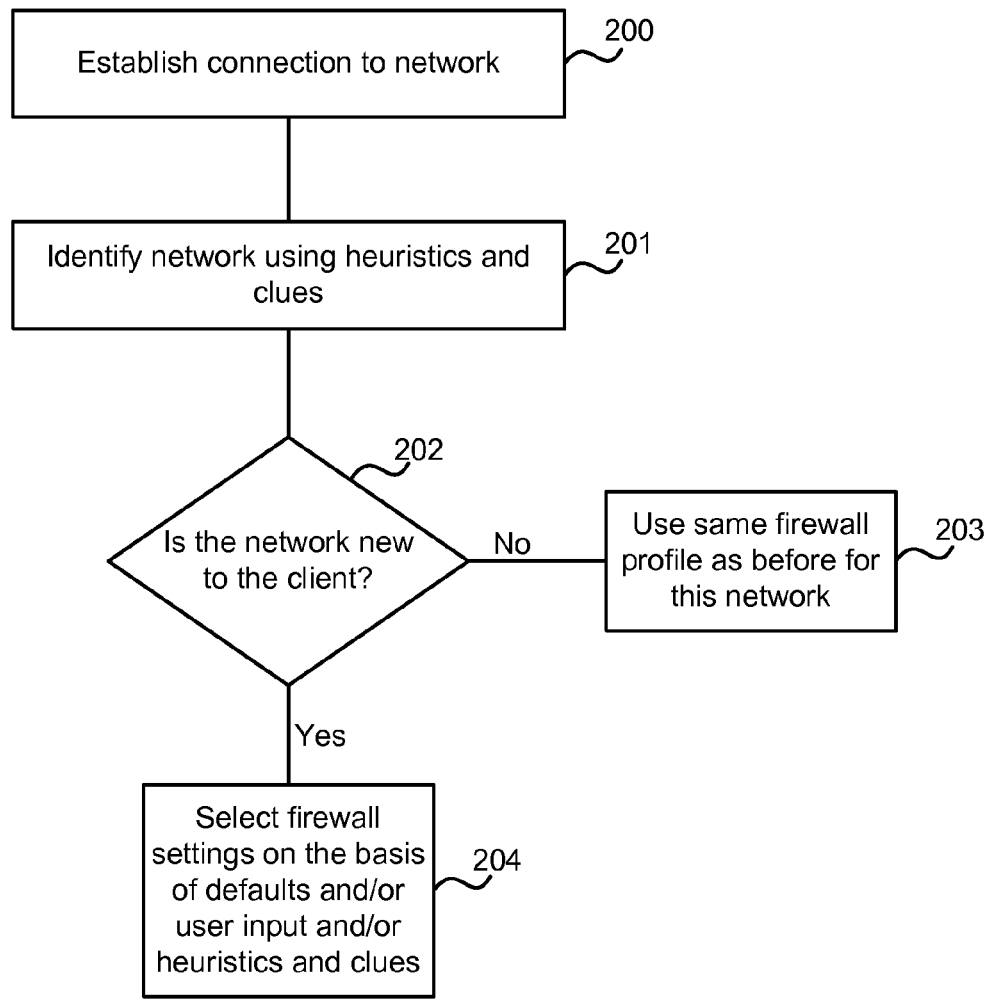
FIG. 2 is a block diagram of a method of network location awareness.

FIG. 2 is a block diagram of an example method carried out at a client 102. The client establishes a connection to the network 100 (block 200) using any suitable communications protocol. It proceeds to identify or recognize the network 100 using heuristics and/or clues (block 201). For example, these clues may comprise a MAC address of an access router on the access network, a MAC address of the access node 101, the SSID of a wireless link (in the case that the client makes a wireless link to the access node 101), wireless authentication state information, and information about any domain controller provided in the network 100. The client goes on to assess whether the network 100 is new or whether it has been visited by the client 102. This assessment is made using the results of block 201 together with stored information about previously visited networks. If the network has been visited before the client is able to use the same communications settings including firewall profile as previously for this network (block 203). If the network is new to the client, the client is able to select communications and firewall settings using default settings for example. It is also possible for the client to seek user input about the network and which communications and firewall settings to use and/or to use any heuristics or clues (such as those at block 201) in order to select the settings. In some cases an administrator may configure the settings, for example, using a group policy.

It is recognized herein that this type of network location awareness process described with reference to FIG. 2 is insecure when the client 102 identifies the network 100 using unauthenticated information provided by the network 100. This information could be spoofed. For example, consider a home wired Ethernet. In this case, the MAC address of a gateway at that home network is typically used by a client in order to identify the network. If the gateway MAC address of the home private network is discovered by an attacker, for example, by sniffing the local link, that information can be used later by the attacker to breech security. Suppose a laptop computer is used at the home network and it associates the gateway MAC address of the home network with relaxed security settings. Later, when the laptop is being used at an airport or other public place, an attacker can spoof the home gateway MAC address and carry out file sharing or other activities with the laptop.

In another example, a contractor connects his laptop computer to a corporation's intranet which has a domain controller. The laptop is able to discover the domain controller but is unable to carry out mutual authentication. The laptop proceeds to use a root domain GUID to provide network identity and relaxed security settings become associated with this information. Later, at an airport for example, an adversary spoofs the root domain GUID and is able to access the laptop for file sharing or similar activities which are typically only enabled under relaxed security settings.

The term "authenticate" is used herein to refer to a process of assessing whether an entity has the identity which it purports to or represents itself as having. With respect to secure network location awareness, an entity such as an access node, may represent or advertise its identity. Clients requiring to access a network via that access node may require authentication of that access node.

The term "authorize" is used herein to refer to a process of assessing whether an entity is allowed to carry out a specified action. For example, in the context of secure network location awareness, it may be necessary to check whether an access node is authorized to advertise a particular network node.

Figure 3:
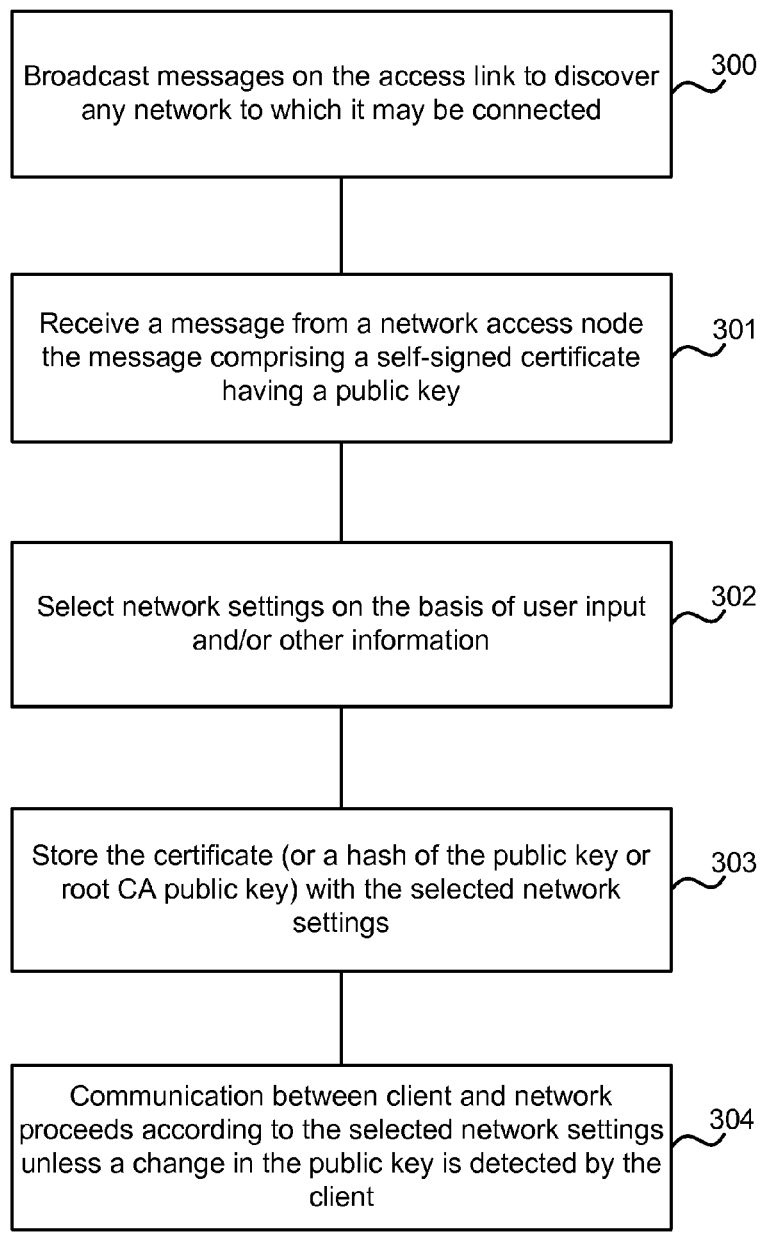
FIG. 3 is a block diagram of an improved method of network location awareness in which a client accesses a network for the first time.

In an improved network awareness process as now described, attackers are prevented from spoofing network locations to a client such as a mobile computer. FIG. 3 is a block diagram of an example method at a client (102 of FIG. 1) whereby the client connects to a network which it has not visited before.

With reference to FIG. 3 a client makes its first visit to a network. The client sends messages on an access link to the network to discover the network (or networks) to which it is connected (block 300). The message may be broadcast so that the client need not know any server identifiers or addresses of an access node although this is not essential. The client receives a message from a network access node (block 301) the message comprising a self-signed certificate having a public key. The client proceeds to select network settings for the new network on the basis of user input and/or other information (block 302). For example, this other information may comprise any one or more of default settings, administrator settings, heuristic and clue information or other information. The client stores the selected network settings together with information about the public key (block 303).

For example, this information about the public key might be the certificate itself or a hash of the public key or the root certification authority (CA) public key. Communication between the client and the network then proceeds according to the selected network settings unless a change in the public key is detected by the client (block 304). Using this process, the appropriate network settings are made and stored with public key information that can later be used, in repeat visits, to guard against spoofed network location information. Repeat visits are now described with reference to FIG. 4.

Figure 4:
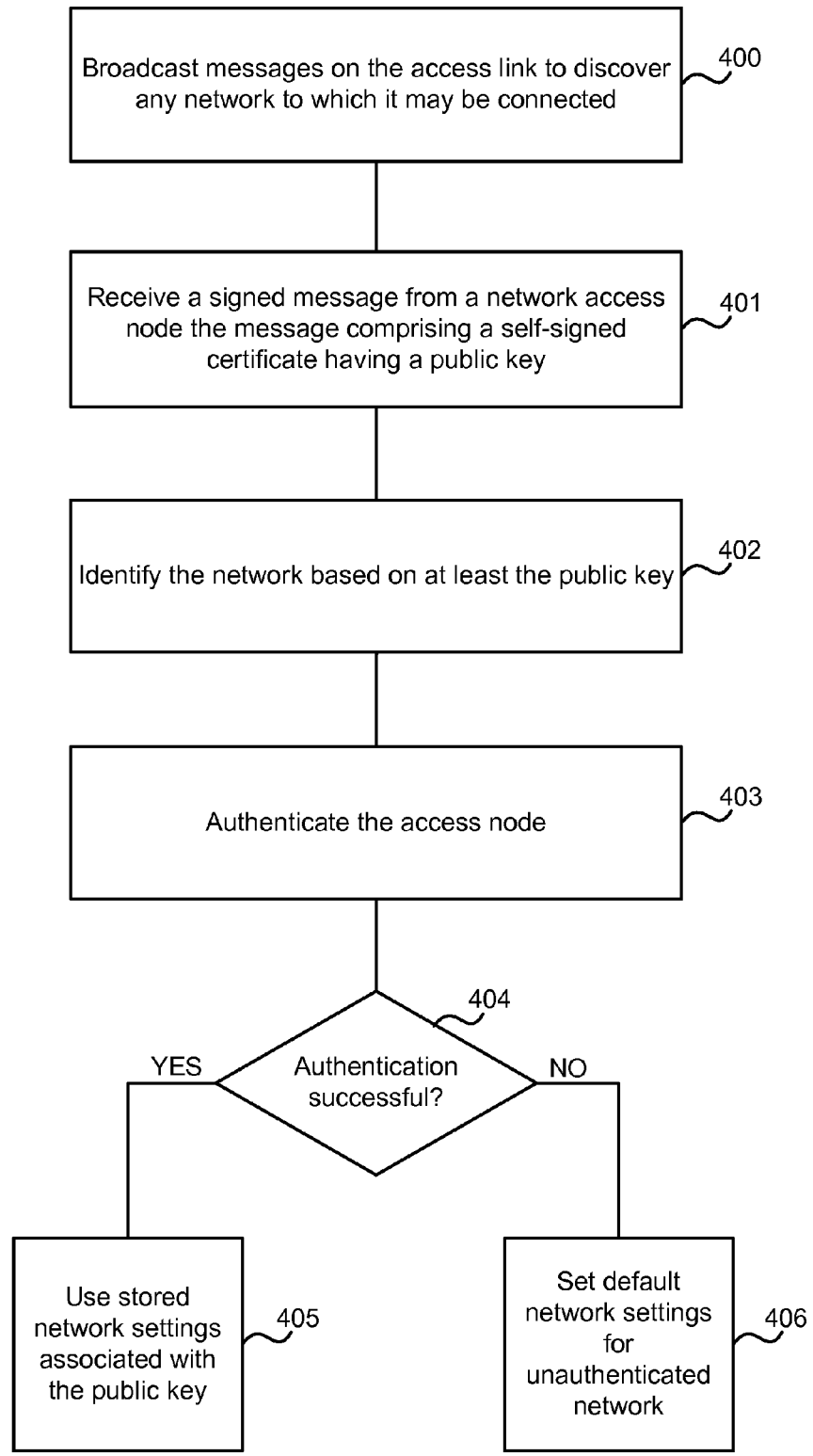
FIG. 4 is a block diagram of an improved method of network location awareness in which a client may make a repeat visit to a network.

As shown in FIG. 4, on a potential repeat visit to a network, a client sends messages to discover any network to which it may be connected (block 400). The messages may be broadcast rather than being sent to a known address. The client receives a signed message from a network access node which has received the discovery message. This signed message comprises a self-signed certificate having a public key (block 401).

The client is now able to identify the network at which the access node is located by using at least the public key information (block 402). It proceeds to authenticate the access node (block 403) by verifying the signature of the signed message. This signature verification process involves using the public key information to check whether the access node really issued the signed message. If authentication is successful (block 404) the client proceeds to use stored network settings associated with the public key (block 405). These network settings have been stored during the first visit to the network as described above with reference to FIG. 3. If authentication is not successful (block 404) then the client sets default network settings for an unauthenticated network (block 406) and in effect treats the network as if it were a new one being visited for the first time. For example, these defaults may be settings giving very restricted communication between the client and the network. An alert may also be made to a user of the client machine and in some examples, communication between the client and the network may simply be prevented.

Figure 5:
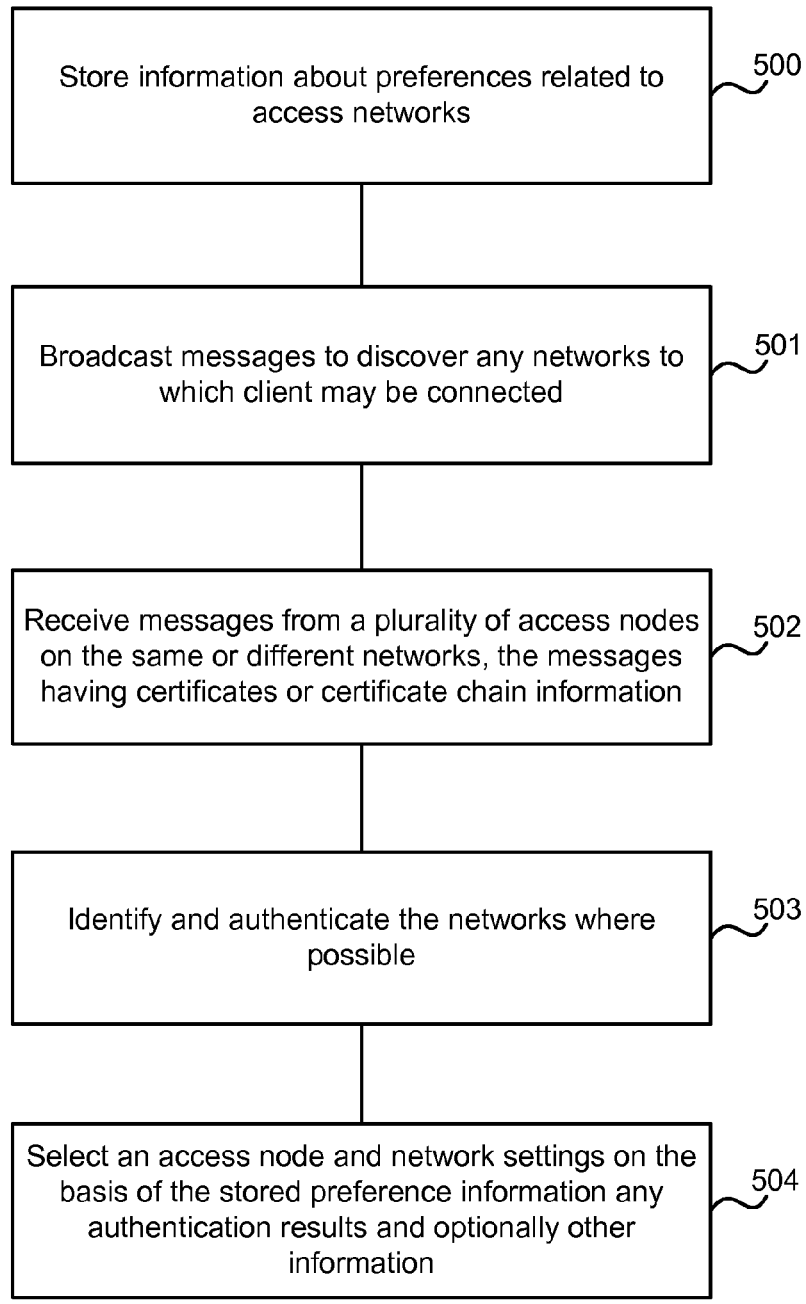
FIG. 5 is a block diagram of a method of network location awareness where several access nodes are discovered.

In some examples, the client may discover more than one access node at one or more communications networks. The client may store information about preferences related to access networks (block 500, FIG. 5). For example, private networks may be preferred over public networks at all times, or under specified conditions. The client proceeds to broadcast messages to discover any networks to which it could potentially be connected (block 501) and receives messages from a plurality of access nodes on the same or different networks (block 502). Each of the messages comprises a certificate or certificate chain information. The client identifies and authenticates the different networks where possible (block 503). For example it may use heuristics and clues to identify the networks and may use similar methods to that described above with reference to FIGS. 3 and 4 to authenticate the access nodes. If more than one access node is authenticated successfully then the client has a choice of which access node to proceed with communications. It makes this choice (block 504) at least using the stored preference information together with the authentication results.

In the examples discussed above with reference to FIGS. 3 to 5 it can be seen that authentication of an access node is achieved in a simple and effective manner based on public key information and a signed message received from the access node. The ability to recognize previously visited networks is thus provided based on public key information. It is not essential for a particular message or message type to be signed provided that at least one signed message is received from the access node. Any suitable communications protocol may be used to provide the messages. If an adversary were to spoof a MAC address such as in the scenario discussed above with reference to FIG. 2, it would still be unable to provide appropriately signed messages as in the process of FIG. 4. It would then fail the authentication process and be treated as a new network In the example discussed above with reference to FIGS. 3 and 4 the client received a message from the access node comprising a self-signed certificate having a public key. Because the certificate is self-signed, no certification authority is required. This helps in situations where there is no trusted authority to verify network identity. For example, access networks are often set up by individuals or small businesses who do not want to go through the trouble and expense of obtaining a certificate from a commercial certification authority (CA). Individuals and small businesses often do not have the resources or expertise to set up their own CA, which would require them not only to deploy server certificates to the access nodes but also to distribute a root certificate to all potential clients.

The self-signed certificate, such as a self-signed X.509 or SSL (secure socket layer) is a widely used way of storing and communicating a public key. However, In other embodiments of the invention the public key is transferred as raw public-key data instead of being packaged as a self-signed certificate.

In other embodiments of the invention a CA is available. In this case certificate chains are used comprising a plurality of certificates in series stemming from a root certificate issued by the CA. However, herein we use the term "certificate chain" to include the case where the chain is of length 1 and comprises only a self-signed certificate.

Another group of embodiments is now described with reference to FIGS. 6 and 7 in which a certificate chain is used. A CA may be present in which case the certificate chain may be two or more certificates in length. Alternatively, the certificate chain may comprise a single, self-signed certificate in which case no CA is required. In this group of embodiments the access node provides a certificate chain comprising a public key as well as a location identifier and both these are used in the network location awareness process. By using a location identifier as well as a public key the network location awareness process is made more flexible.

The client may identify the network based on a network identifier which may be a public key of the access node, a combination of the public key of the access node and the location identifier sent by the access node, or a combination of the root public key of a certificate chain and the location identifier sent by the access node. Any additional information about the network, such as indication of the network being a public location, may be included additionally into the network identifier. All or parts of this information may be hashed with a cryptographic hash function to provide a more compact representation of the network identifier. The network operator may configure one or more access nodes to use the same public key in combination with multiple different location identifiers to identify multiple different networks to the client.

Figure 6:
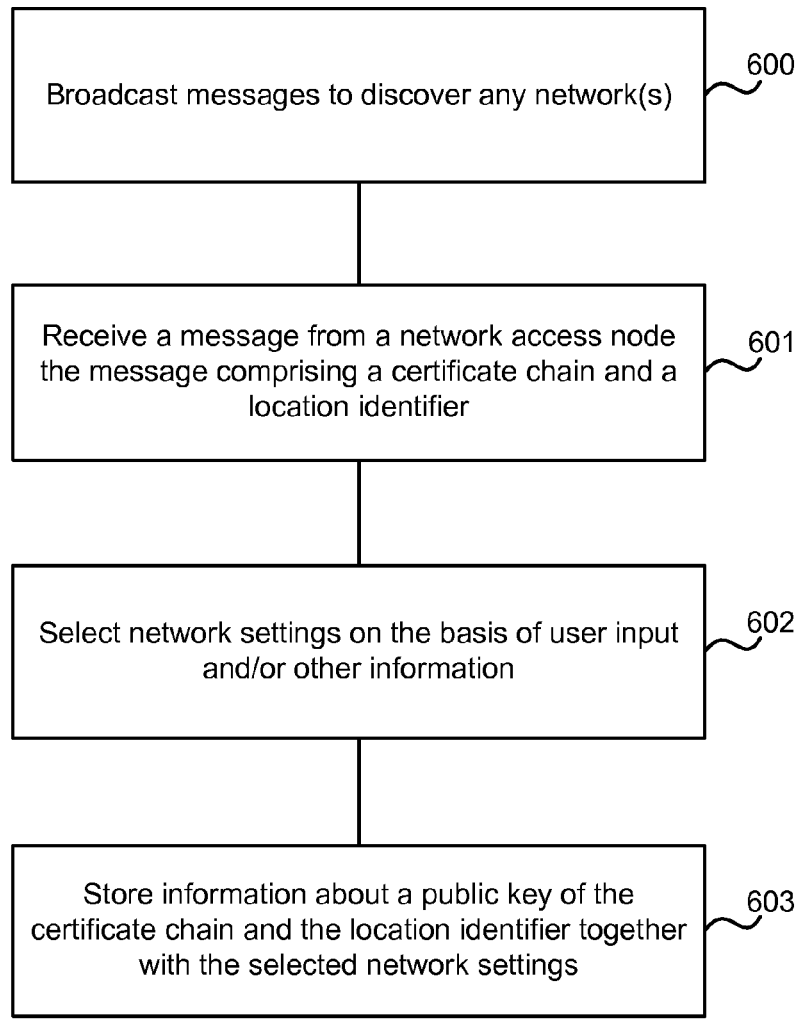
FIG. 6 is a block diagram of a method at a client making a first visit to a network.
Figure 7:
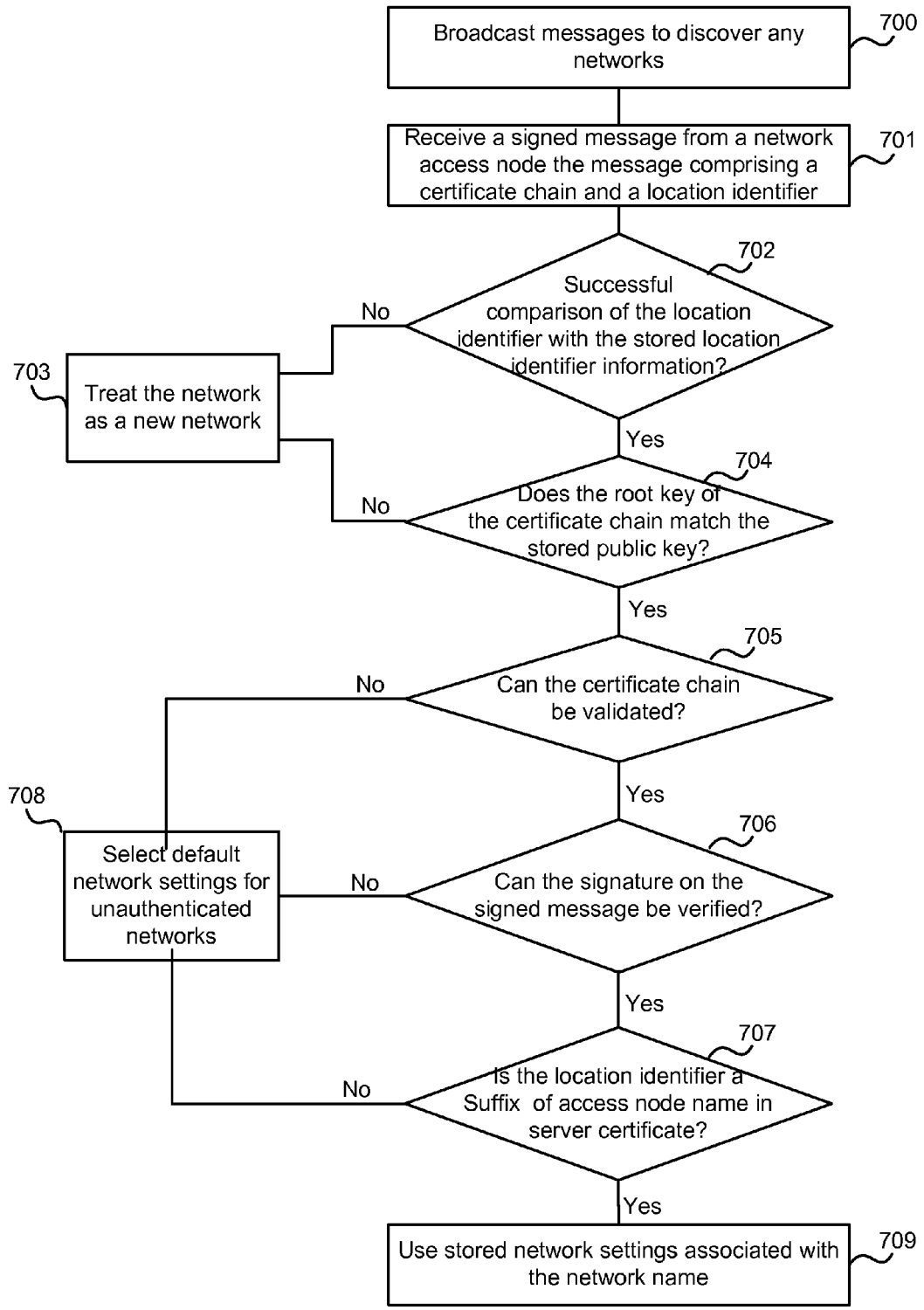
FIG. 7 is a block diagram of a method at a client making a repeat visit to a network.

Referring now to FIG. 6 the client broadcasts messages to discover any network(s) to which it may be connected (block 600). It receives a message from a network access node, the message comprising a certificate chain and a location identifier (block 601). As mentioned above, the certificate chain may be two or more certificates in length and stem from a root certificate issued by a CA. Alternatively, the certificate chain may comprise a single, self-signed certificate. The location identifier may be a local DNS (domain name system) domain suffix of the access node, for example, where the access node is a DHCP (dynamic host configuration protocol) server. However, this is not essential, the location identifier may be any network name.

If this is a first visit by the client to the network, the client proceeds to select network settings on the basis of user input and/or other information (block 602). For example, heuristics and clues may be used as mentioned above. Information about a public key of the certificate chain and the network location identifier is then stored by the client, together with the selected network settings (block 603). In some cases the public key itself is stored although it is also possible to store a hash of the public key or a hash of the public key and the location identifier. The stored public key could be the public key of the access node or the root public key of a certificate chain.

The process which occurs when the client makes a repeat visit to the network is now described with reference to FIG. 7. The client broadcasts messages to discover any networks to which it may connect (block 700). It receives a signed message from a network access node the message comprising a certificate chain and a location identifier (block 701). As mentioned above the certificate chain may be of length 1 or may start with a root certificate issued by a CA and end with a certificate issued by the access node, with zero, one or more intermediate certificates. The location identifier may be a DNS domain suffix of the access node or may be any other suitable location identifier. The client then proceeds to make a comparison between the location identifier received from the access node and its stored location identifier information (block 702). If no match is found the network is treated as a new network (block 703). Otherwise the client checks whether the root public key of the certificate chain matches the stored public key for the relevant location identifier (block 704). If there is no match the network is treated as a new network (block 703). Otherwise the client checks whether the certificate chain can be validated, including checking a server certificate issued to the access node (block 705). In one example, the client does not check that the certificate chain starts in a root certificate issued by a trusted CA but instead accepts any public key as the root public key of the certificate. If the certificate chain is not validated then the client selects default network settings for unauthenticated networks (block 708). Otherwise, if the certificate chain is validated, the client checks whether the signature on the signed message can be verified (block 706). If not, default network settings for unauthenticated networks are used (block 708). Otherwise, a check is made as to whether the location identifier matches a name of the access node present in the access node certificate of the certificate chain (block 707). This matching may be done, for example, by checking that the location identifier is a suffix of the name in the certificates. If there is no match, default network settings for unauthorized networks are used (block 708). Otherwise the stored network settings associated at least with the root public key and the location identifier are used (block 709). It is noted that decision blocks 702, 704, 705, 706 and 707 of FIG. 7 may be carried out in parallel or in different sequences or combinations from that illustrated in FIG. 7.

Additionally, the client may check whether the root public key of the certificate chain belongs to a well-known or otherwise trusted certificate authority. If this is true, the client may use network settings associated with only the location identifier and no public key in block 709.

Using the scheme described above with reference to FIGS. 6 and 7 it is possible to reuse existing server certificates, including SSL (secure sockets layer) server certificates for the access node authentication. This assists network operators for whom the cost of issuing or purchasing new certificates specifically for network authentication may be too high.

Figure 8:
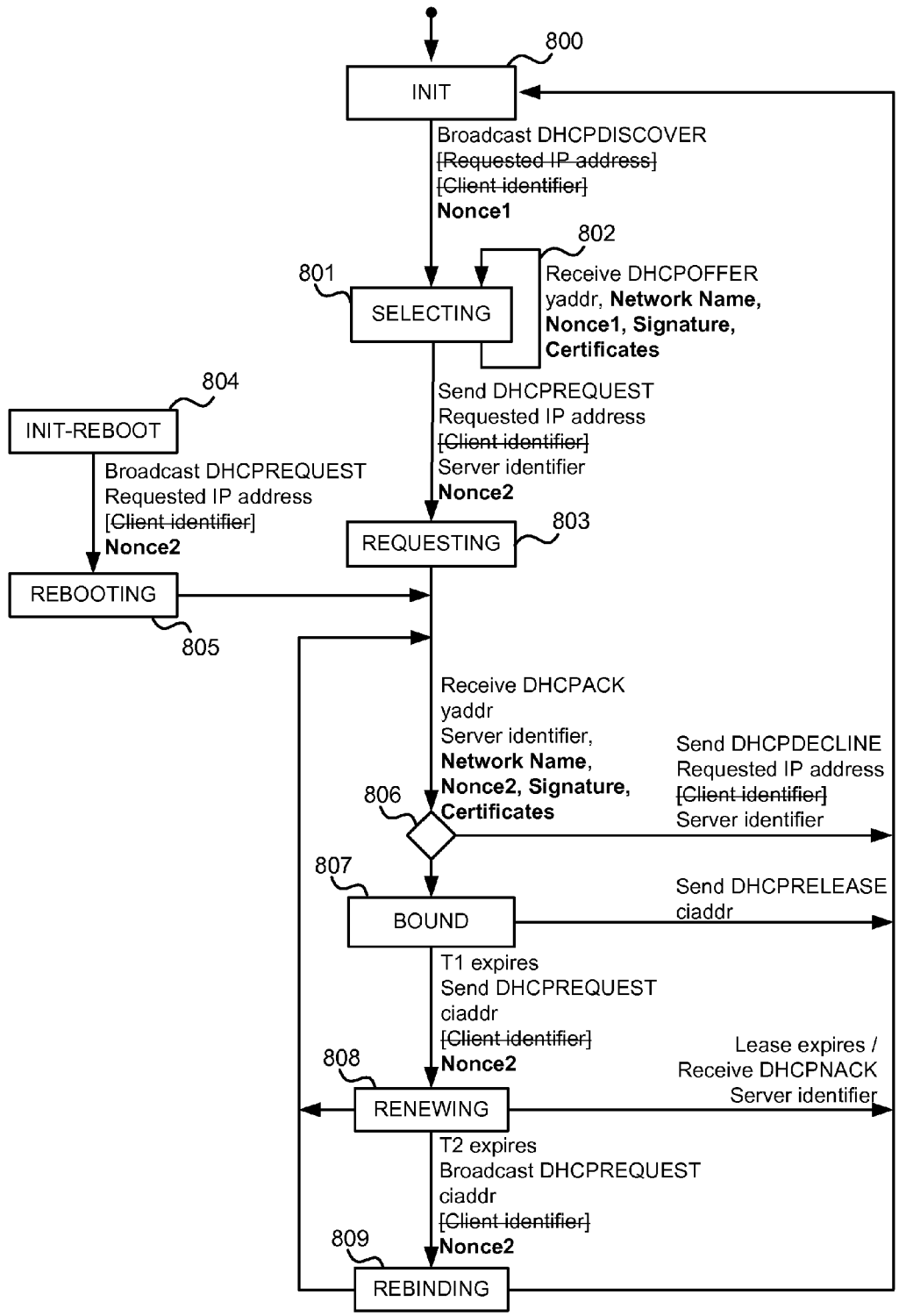
FIG. 8 is an example client state machine diagram.

As mentioned above any suitable protocol may be used to provide the messages between the access node and client. For example, dynamic host configuration protocol (DHCP) may be used in the case where the access node is a DHCP server. This is discussed in detail below with reference to FIGS. 10 and 11. In addition, FIG. 8 is an example client state machine diagram showing example improvements to DHCP messages such that secure network location awareness is provided.

The client begins in an initial state (block 800) and it broadcasts a DHCPDISCOVER message comprising any suitable DHCPDISCOVER message (or equivalent) as known in the art but additionally comprising nonce1 (see below for more information about nonces). Some information in the DHCPDISCOVER message may be omitted to protect client privacy such as a host name or other client identifier. However, this is not essential.

The client then moves to a selecting state (block 801) in which it receives one or more DHCPOFFER messages 802 from servers. These messages each comprise fields as known in the art but additionally comprising nonce1, a network name, a signature of the server from which the message is sent, and a certificate chain of the server. The certificate chain may comprise a single self-signed certificate as mentioned above. The client selects one of the offer messages and sends a DHCPREQUEST message. This comprises fields as known in the art but may additionally comprise nonce2 in some embodiments as described in more detail below. Some information in the DHCPREQUEST message may be omitted to protect client privacy such as a host name or other client identifier although this is not essential. FIG. 8 indicates this by an overstrike through fields which may be omitted to protect client privacy.

In the case that the client is rebooted (block 804) after already having completed the selection step (block 801) then the DHCPREQUEST message is broadcast in a similar manner as at block 801. The client then moves from a rebooting state (block 805) to the requesting state (block 803).

The client receives a DHCPACK message which may comprise fields as known in the art and additionally nonce2, a signature of the server, a certificate chain of the server, and a network name or other location identifier. The client enters a decision state (block 806). If it decides to decline the DHCPACK message it sends a DHCPDECLINE message comprising fields as known in the art. Of these, a client identifier field may be omitted for privacy. The client then returns to the initial state (block 800).

If the client decides to accept the DHCPACK message it enters a bound state (block 807) in which the server reserves an IP address for the client typically for a limited time period. From this state it may release the binding by sending a DHCPRELEASE message as known in the art and return to an initial state (block 800). If the time period expires, the server stops reserving the IP address for the client. In this case the client sends another DHCPREQUEST as known in the art but additionally this may comprise nonce2. The client enters a renewing state (block 808). If renewal of the reservation is not successful then a DHCPNACK is received and the client returns to the initial state (block 800). If the renewal is successful the client returns to the requesting state (block 803). It is also possible for the client to attempt the renewal again after expiry of a second time period. In this case another DHCPREQUEST is broadcast again comprising nonce2 and a rebinding state (block 809) is entered. If this rebinding is successful the client returns to the requesting state (block 803). If not, then the client returns to the initial state (block 800).

Figure 9:
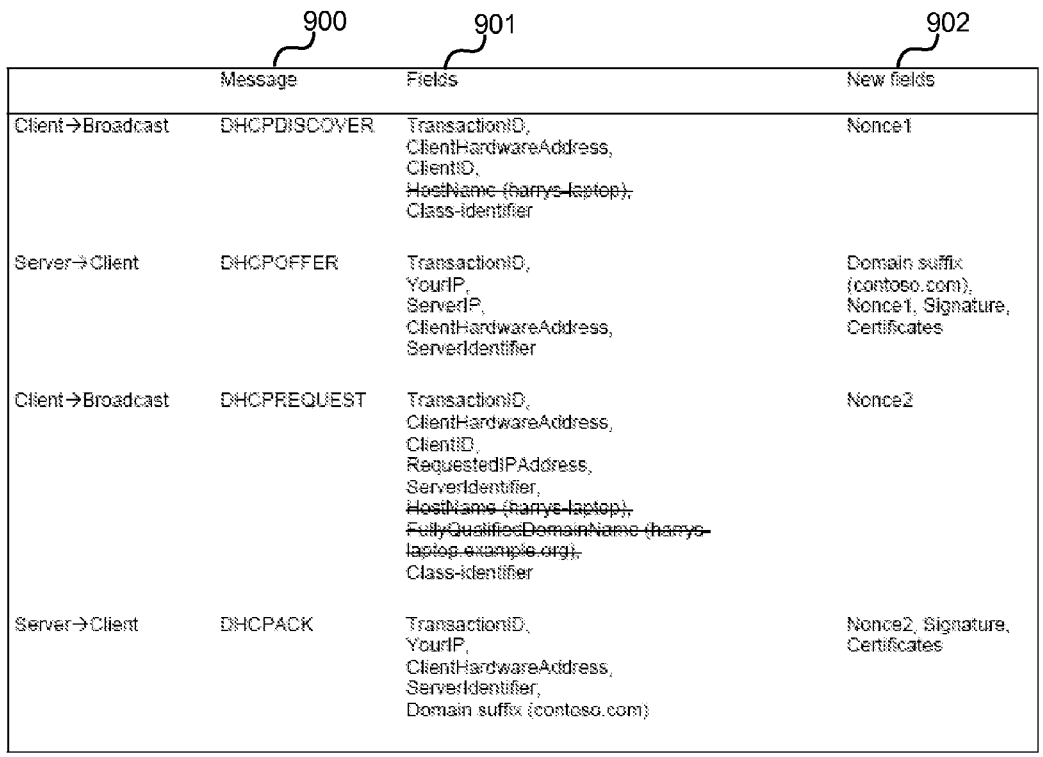
FIG. 9 is a table showing example message types and message fields for use in a network location awareness process.

FIG. 9 is a table showing example message types and message fields for use in a network location awareness process. Four types of DHCP messages 900 are shown in the table together with a list of example fields 901 for each of these messages as used in a typical DHCP execution. Examples of new fields 902 to be added to the messages are indicated, those new fields being arranged to enable secure network location awareness to be provided. Existing fields 901 which are struck through in FIG. 9 are examples of fields which may optionally be omitted in an improved DHCP execution.

Figure 10:
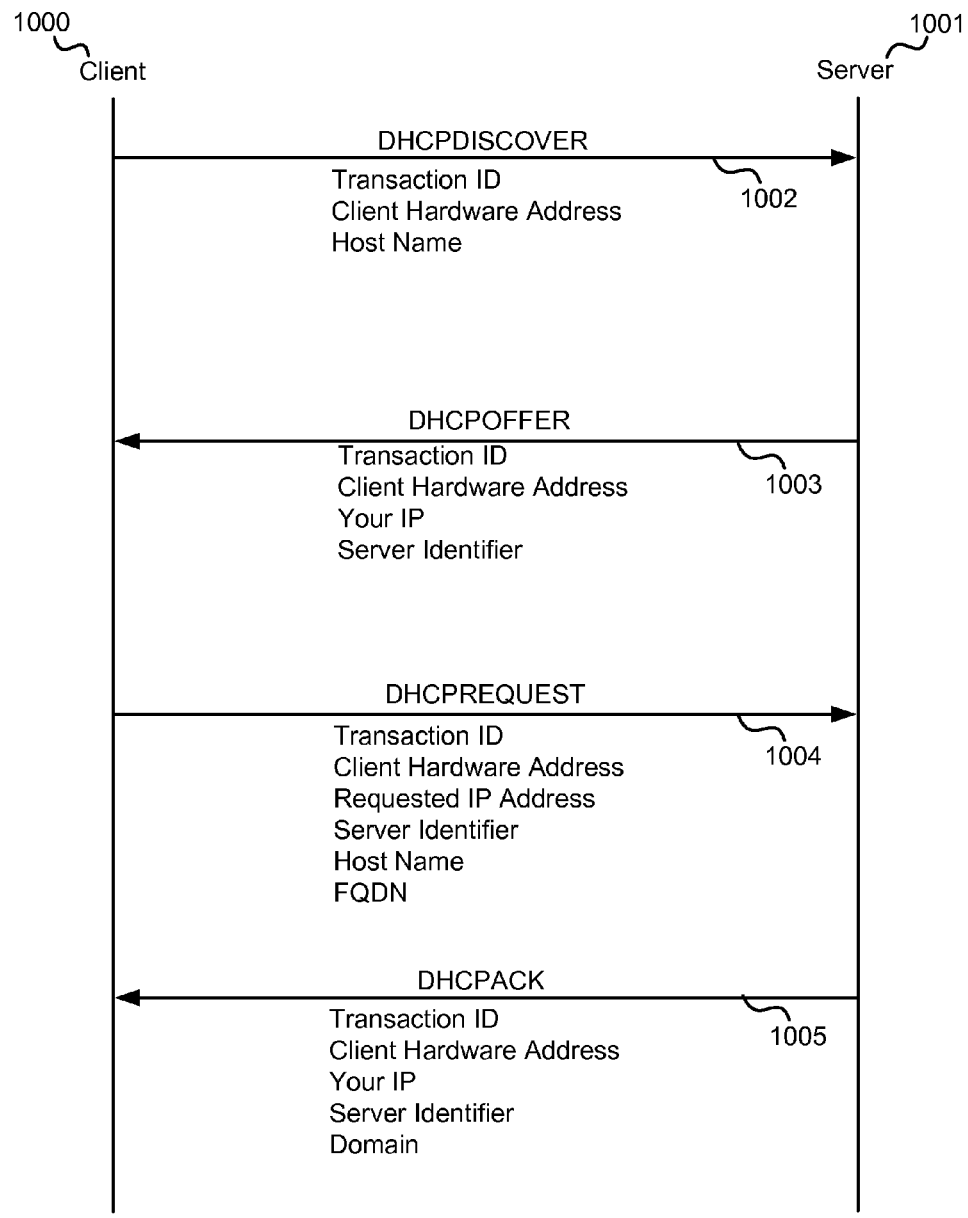
FIG. 10 is an example message sequence diagram.

FIG. 10 is a message sequence chart of a typical DHCP execution when a mobile computer first enters an access network. This message sequence chart is high level focusing on features relevant to the methods described herein and only selected data fields are shown. A client, such as a mobile computer, is represented by a vertical line 1000, as is an access node or server 1001. Messages sent between these entities are shown as horizontal arrows with the direction of the arrow representing the direction of the message flow. The position of the arrows relative to one another vertically on the page indicates the sequence of the messages in time. The execution consists of two request-response pairs, which are sent in UDP (user datagram protocol) packets. The requests (1002, 1004) are broadcast on the local link with no source address. The responses (1003, 1005) are sent as unicast from the server (access node) to the offered client IP address. It is also possible for clients 1000 to request broadcast responses.

The client 1000 sends a DHCPDISCOVER message 1002 to the server 1001. This message comprises a TransactionID which is chosen by the client 1000 and which is included in each subsequent message of the execution in order to link the messages together. The DHCPDISCOVER message 1002 also comprises a Client Hardware Address which is unique to the link between the client and server and which is used by the server 1001 to identify the client 1000. The DHCPDISCOVER message also comprises a HostName of the client 1000. For example, this could be Harry-laptop in the case of a laptop computer used by a person called Harry. By sending its host name in this way the client 1000 enables the server 1001 to select host-specific parameters.

The client 1000 receives one or more DHCPOFFER messages 1003 from servers 1001 although only one is shown in FIG. 10 for clarity. The DHCPOFFER message comprises the TransactionID from the DHCPDISCOVER message and also the client hardware address from the DHCPDISCOVER message. In addition, the DHCPOFFER message 1003 comprises an IP address of the server 1001 and an identifier of the server 1003.

The client may receive multiple DHCPOFFER messages from different servers 1001. It chooses one offer from one server 1001 and broadcasts a DHCPREQUEST message 1004. This message is interpreted as a request by the chosen server 1001 and as a rejection message by all other servers. The DHCPREQUEST message 1004 comprises the TransactionID, the client hardware address, and the host name as in the DHCPDISCOVER message 1002. It also comprises an IP address of the client 1000 shown in FIG. 10 as 'Requested IP Address', the server identifier and may also comprise the client's fully-qualified domain name (FQDN) so that the DHCP server can update a DNS entry for the client with the requested IP address.

The client receives a DHCPACK message 1005 comprising the Transaction ID, the client hardware address, an IP address of the server, an identifier of the server and a local domain suffix of the network to which the server provides access. With the DHCPACK response, the server commits the requested address to the client 1000. The server 1001 has no obligation to reserve the address for the client until it sends this acknowledgement message 1005. If the address is no longer available when the server receives the request it responds with a DHCPNACK message, after which the client 1000 may reinitiate the protocol.

Figure 11:
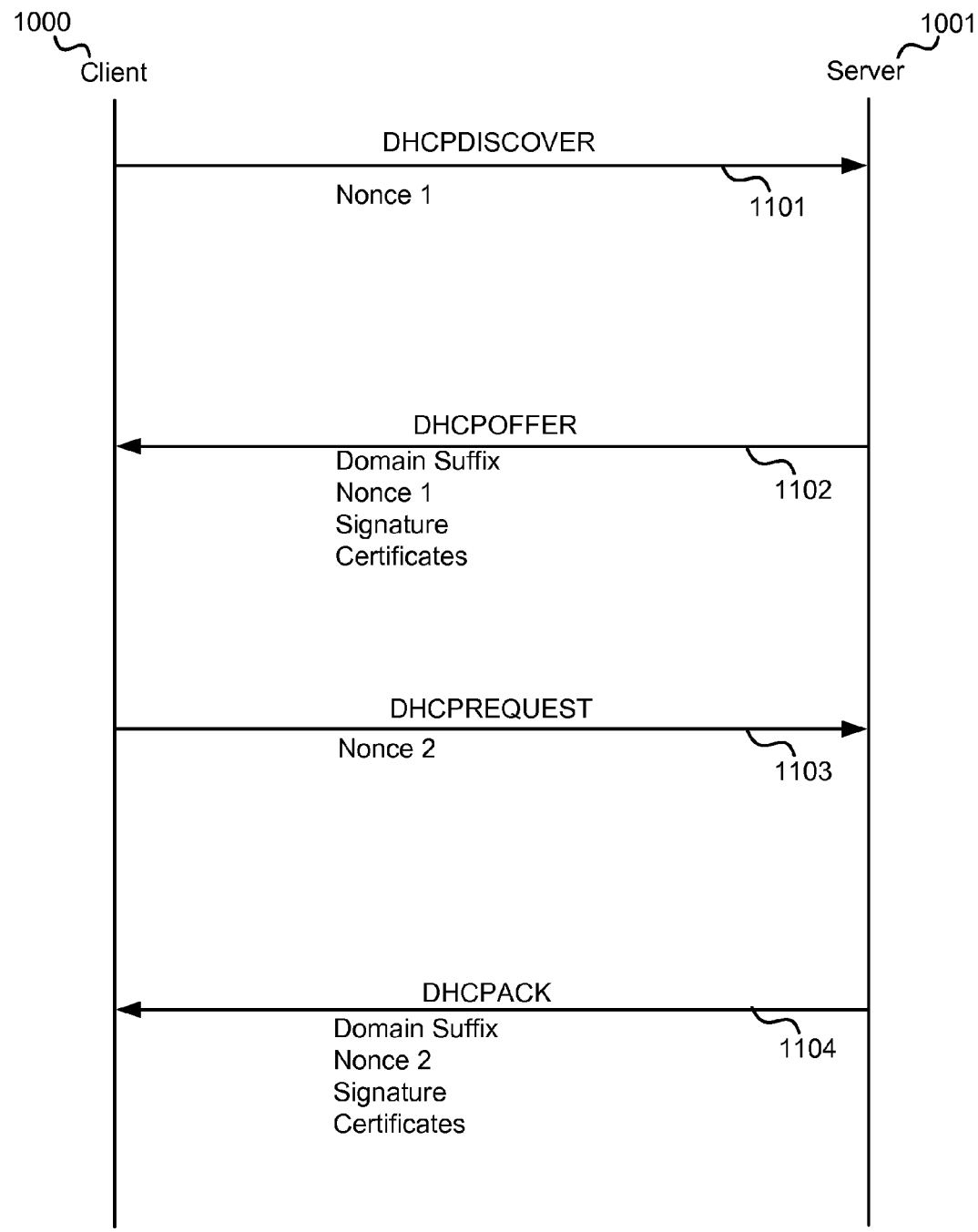
FIG. 11 is another example message sequence diagram.

FIG. 11 is a message sequence chart of an improved DHCP execution when a client first enters an access network. It shows information that is added to DHCP messages such as those of FIG. 10. As in FIG. 10 the execution comprises two request-response pairs. A DHCPDISCOVER message 1101 is broadcast by the client 1000 and this message may be the same as the DHCPDISCOVER message of FIG. 10 but also comprising a random number, nonce1. This nonce1 is generated by the client 1000 using a random or pseudo-random number generation process. The nonce is used to prevent replay attacks as described in more detail below.

The DHCPOFFER message 1102 sent by the server 1001 to the client 1000 is the same as that of FIG. 10 but also comprising a copy of the client nonce1, the server's signature, the server's certificate chain (which may be a single self-signed certificate as described above) and, for network identification, a location identifier such as a local domain suffix of the server.

The DHCPREQUEST message 1103 is the same as that of FIG. 10 but also comprising a second nonce, nonce2 which is freshly generated by the client 1000. The DHCPACK message 1104 is also the same as that of FIG. 10 but also comprising a copy of nonce2, a signature of the server 1001, the server's certificate chain and, for network identification, a location identifier such as a local domain suffix of the server.

In the above example discussed with reference to FIG. 11, both the responses (the DHCPOFFER and the DHCPACK) are signed. However, this is not essential. It is possible for only one of these responses to be signed; that is, only one of the responses needs to be authenticated in some cases.

In some embodiments the client 1000 decides which responses need authentication and sends a nonce in the request message (DHCPDISCOVER, DHCPREQUEST or equivalent) to indicate this. The server is arranged to automatically sign a response whenever the request comprises a nonce. Thus a simple client is able to ask the server to sign all responses while a smarter client is able to leave the nonce out whenever it does not need the security.

In some embodiments, the client is arranged to always ask the server to sign the offer message (DHCPOFFER or equivalent). This provides improved privacy in some situations. For example, an active attacker may send offers that appear to come from various DHCP servers. The attacker may observe which of the offers the client prefers and use that information to discover the client's preferred networks and affiliation. By asking the server to sign the offer message this is prevented.

In some embodiments using a four message protocol execution comprising two request-response message exchanges, it is sufficient to authenticate only the offer message (DHCPOFFER or equivalent). For example, this is the case if the main purpose of the authentication is to secure network location awareness. In that case, omitting the second signature may save network bandwidth and CPU resources at the client and server. However, if it is also required to authenticate host-configuration parameters obtained from the DHCP server (or other access node), then the acknowledgement message (DHCPACK or equivalent) is preferably also signed. In some embodiments, a signature is required on all messages from the server when the client knows that the server supports authenticated DHCP (or equivalent). This may help to protect against various denial-of-service attacks.

In some embodiments, where a two-message request-acknowledgement protocol is used (for requesting a previously allocated address) the client may always ask the server to sign the response message in order to detect changes in network attachment in a secure way.

As mentioned above, the nonces are used to prevent replay attacks. These are preferably freshly generated random or pseudo-random numbers which are unpredictable (for practical purposes) and are not repeated with more than negligible probability. For example, the nonces may be about 128 bits long.

However, it is not essential to use nonces. Instead, other freshness indicators such as sequence numbers may be used. In this case, allowance needs to be made for situations in which the client may accidentally repeat the same sequence after state loss for example. Also, it needs to be taken into account that sequence numbers may be used to correlate the appearances of the same mobile computer in different networks. Where the loss of privacy caused by the use of sequence numbers is unlikely to be a problem, or where privacy is accounted for using an additional method, then sequence numbers may be used.

Another alternative to nonces is to use time stamps as the freshness indicator in situations where accurate and secure real-time clocks are accessible to servers and clients.

As mentioned above with reference to FIG. 7 the signed message form the server (or access node) preferably comprises a location identifier. For example, as illustrated in FIG. 8 this may be a network name such as a domain suffix (see FIG. 9 and FIG. 11). The authentication process may then also comprise checking whether the location identifier matches the access node name in the server certificate (block 707 of FIG. 7). The matching may be done by checking that the location identifier is a suffix of the access node name. In this way it is possible to use existing X.509 certificates and similar types of certificates without the need to extend the certificate standards.

The location identifier or network name may therefore be a local DNS suffix advertised by the access node (such as a DHCP server for example). For example, the client verifies that the advertised DNS suffix is a suffix of the access node (or server) FQDN (fully-qualified domain name) in the server certificate. The suffix may be the entire FQDN, just the last segment such as com, or something in between.

Consider a server dhcpserver.sales.contoso.com. An organization operating this server may decide to name its networks by department (sale.contoso.com) or to treat each network as one large network (contoso.com). Using the methods described herein, any departmental access node may use the longer and more accurate sub-domain name or the shorter and coarser company-wide name.

A malicious server could name its network corn or co.uk and impersonate any other network that uses the same name. However, this does not matter because no honest network uses such names. This is because an access node or network that assumes the name corn will not have any authority over longer names such as contoso.com. Any server that selects too short a name for its network will only compromise the security of its own network, not anyone else's. The same applies to rogue departmental servers that try to hijack an unused organizational name.

In some embodiments a large network is present which has a plurality of access nodes such as DHCP servers or the like. An example of this type of embodiment is now described with reference to FIG. 12. A common trusted root certification authority (CA) is provided between the servers and clients in order to support secure network level awareness in this type of situation. The CA may be administered by the organization itself or it may be an external commercial CA.

Figure 12:
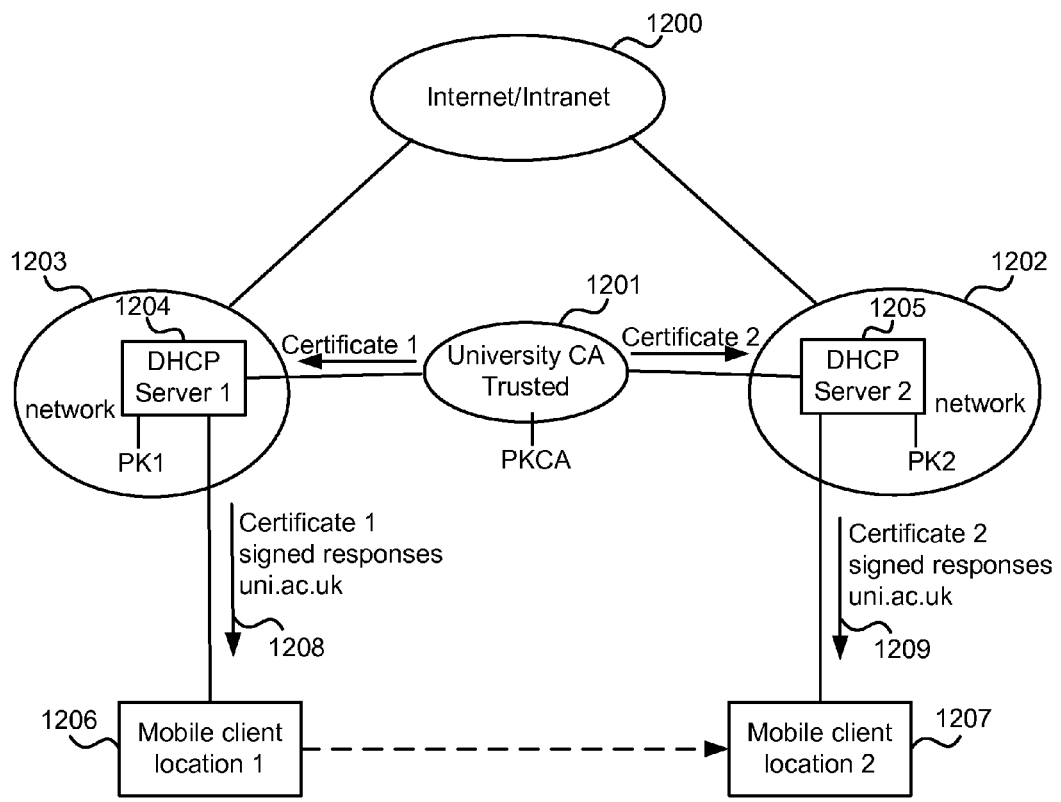
FIG. 12 is a schematic diagram of a mobile client connected to a modular communications network at one of two locations.

FIG. 12 is a schematic diagram of a mobile client connected to a modular communications network at one of two locations 1206, 1207. The modular communications network comprises a network 1203 at a first location such as a university campus site, having a DHCP server 1, 1204. A second network 1202 is also provided at another university site which is off-campus. The second network 1202 comprises a second DHCP server 2, 1205. Each of the first and second networks are connected to the Internet, or an intranet or other communications network 1200. A certification authority (CA) 1201 which is trusted by the University is provided in the modular communications network or at an offline location and issues a certificate to each of the DHCP servers. A public key of the CA 1201 may be PKCA for example and each of the DHCP servers also has a public key, PK1 for DHCP server 1 and PK2 for DHCP server 2. The certification authority 1201 issues certificates to the DHCP servers in order to bind them into one logical network location. For example, these are indicated as certificate 1 and certificate 2 in FIG. 12. Each of the certificates contains the DNS name of the server, which could be dhcp1.uni.ac.uk and dhcp2.uni.ac.uk, for example. The network operator is able to decide the granularity of the DNS suffixes advertised by the DHCP servers and in this example, each DHCP server is certified and set to advertise the same DNS suffix uni.ac.uk, which is a suffix of each DHCP server name.

Suppose a mobile client is at location 1 1206 and connects to the university network for the first time via DHCP server 1. It follows a method such as that of FIG. 6 and network settings are made and stored together with information about PKCA and the location identifier which in this case is uni.ac.uk. Later, if the mobile client moves to geographical location 2, 1207 it connects to the university network via DHCP server 2. It follows a method such as that of FIG. 7 and as a result the network settings obtained during the first visit to the network at location 1 are re-used. In this way, the different DHCP servers are effectively bound into one logical network location. However, this is not essential. A network operator may also set the DHCP servers to advertise different DNS suffixes. In the example of FIG. 12, these suffixes could be dhcp1.uni.ac.uk and dhcp2.uni.ac.uk (i.e., equal the to the full server names). In that case different network settings may result at the client for the two geographical locations 1206, 1207.

As mentioned above any suitable protocol may be used to provide the messages between the access node and client. For example, dynamic host configuration protocol (DHCP) may be used in the case where the access node is a DHCP server. DHCP is defined by the Internet Engineering Task Force (IETF) in RFC2132 and a detailed example of changes that may be made to DHCP (v4) in order to implement secure network location awareness is now given.

Four new DHCP options are defined: Network Name, Nonce, Signature, and Certificates.

The Nonce, Signature and Certificates options may appear in DHCP messages in the following combinations:

The DHCP client may include the Nonce option in any request sent to the server.

If a DHCP request contains the Nonce option, the server may include the Nonce, Signature and Certificates options in the corresponding DHCP response. In this case, the Signature and Certificates options may be, in this order, the two last options in the DHCP response.

If a DHCP request contains the Nonce option, the server may include the Nonce and Signature options in corresponding DHCP response (without the Certificates option). In this case, the Signature option is the last option in the message.

The server also includes either the Network Name option or the Domain Name option in all signed responses. However, the client processes signed responses that do not contain either one of these options. This may occur, for example, in zero configuration home networks. The client finds the network name in a signed response as follows:

1. If the signed response contains the Network Name option, the client uses the network name from this option.
2. If the signed response does not contain the Network Name option but contains the Domain Name option, the client takes the network name from this option.
3. If the signed response does not contain either the Network Name or Domain Name option, the client uses the string "." (one byte containing the ASCII symbol for full stop) as the network name.

There are several options for how to define the new options. They may be standardized as new BOOTP/DHCP options. They may also be sent using the Vendor Specific Information option (code 43) defined in RFC 2132, Section 8.4. Since the Signature and Certificates options may exceed the maximum length of a single DHCP option, so called long options may be required.

Network Name Option

The Network Name option may comprise a DNS suffix. The format of this option may be the same as the format of the Domain Name option in RFC 2132. An empty suffix may be indicated with the string "." (one byte containing the ASCII symbol for full stop). This option comprises a code field, a length field to store an integer n, and a network name field n bytes long.

Nonce Option

When a client sends this option in a DHCP request, it is asking the server to sign the response. The option also conveys a nonce (fresh random number) from the client to the server. When the server signs the response, it includes an exact copy of the Nonce option in the signed response. There is at most one copy of the Nonce option in any DHCP message. This option may comprise a code field, a length field to store an integer n and a c flag (1 bit). When the c flag is set, the server includes certificates in the signed response.

This option also comprises a nonce field which is of 16 bytes and stores a new random or pseudorandom number generated by the client. An attacker is unable to guess this value for practical purposes.

The option may also comprise an algorithms field of variable length for listing signature algorithms supported by the client.

A client may be arranged to set the c flag in all DHCPDISCOVER messages and in any DHCPREQUEST message that is not immediately preceded by the exchange of DHCPDISCOVER and DHCPOFFER. If a DHCP request follows a DHCPOFFER from the same server, the client may use cached certificates instead of requesting them again. A simple client may set the c flag in all DHCP requests.

Signature Option

The Signature option comprises a public-key signature. It may be the last option in the message, except possibly for a Certificates option. It is preceded by exactly one Nonce option. The signature option may comprise a code field, a length field storing an integer n, a p flag and a signature field. The p flag field is of 1 bit and the server may set this flag to indicate that the client should consider this location as public and, thus, use the strongest security settings.

The Signature field is of variable length and comprises the digital signature.

The signature covers the BOOTP/DHCP header and all options up to but not including the Signature option. Thus, the Nonce option is signed. The Certificates option, which may come after the Signature option, is not signed. The 'giaddr' and 'flags' fields in the header are set to zero for signing in order to allow BOOTB relay agents to function transparently.

Certificates Option

The Certificates option contains a chain of public-key certificates. It may be the last option in the message and it follows immediately after a Signature option. The certificates may comprise a code field, a length field storing an integer n, and a certificates field which stores a certificate chain or a certificate.

The certificates field may contain a self-signed server certificate, a server certificate issued by a certification authority (CA), or a chain of multiple certificates that start from a CA and end in the server certificate. The CA may be a well-known commercial CA, an organizational CA, or an unknown CA established only for the purpose of certifying network locations.

Examples of changes required to a DHCP server are now given. The server has a public signature key and either has a self-signed server certificate or has a certificate chain that ends in a server certificate, which contains the public key and the server's FQDN (in the CN or SubjectAltName field for example). The server advertises a suffix of the FQDN in a Network name or Domain Name option in both DHCPOFFER and DHCPACK. This is the local DNS suffix and is used as a network identifier. The server looks for a Nonce option in the request. If there is one, it copies the Nonce option to the response and adds a Signature option as the last option to the response.

Examples of changes required to a DHCP client are now given.

The client may be arranged to send a Nonce option either in all DHCP messages, or in all DHCPDISCOVER messages and in any DHCPREQUEST messages that do not follow immediately after receiving a DHCPOFFER. The client sets the Certificates Required flag unless it has just received certificates from the same server in a DHCPOFFER and has cached them. When the client has sent a DHCP request with the Nonce option and it receives a corresponding response, it may perform the following steps:

a. The client verifies that the nonce value in the response equals the one in the request.
b. If the response contains certificates, the client verifies that the certificates are valid. If the certificates are invalid, the client processes the DHCP message as if it had no signature. On the other hand, if the client cleared the Certificates Required flag in the request, it uses the cached certificates instead. (It should not repeat the certificate validation.) In either case, the client does not require the root CA to be trusted, which means that it accepts a certificate chain that starts from an unknown CA and even a self-signed server certificate.
c. The client verifies that the location identifier received from the server matches the server name in the server certificate. For example, the location identifier may be a DNS suffix and the server name a DNS host name and the client may check that the location identifier is a suffix of the server name.
d. The client verifies the signature in the Signature option.

If the above steps all succeed, the client uses the information to identify the network location and store or select location-specific communications settings such as firewall profile. On the other hand, if any one of the above steps fails, the client uses default settings for a new network. The above steps may be implemented in the DHCP client module or in an NLA module of the client host, or divided between the two modules. In another embodiment a DHCP server may start to sign DHCP messages without any configuration by an administrator, e.g., in home network. In this case, the DHCP server needs a signature key pair and a self-signed server certificate. These may be either configured by the device manufacturer or generated automatically by the server itself when it is first booted. The DHCP server also needs a network name. If an administrator has configured the server with a local DNS suffix, it may send it in the Domain Name option in the signed responses and not send a Network Name option. Otherwise, the server may send the string ".", which signifies an empty suffix in the Network Name option. With this information, the server can start looking for Nonce options and to sign the corresponding DHCP responses.

The client my use the following information to identify the network location:
  The root public key in the certificate chain. If the chain is just a self-signed certificate, this is the server public key.
  The fully qualified server name (FQDN) specified in the server certificate.
  A flag indicating whether the server certificate specifies "Network Location Authentication" as an application constraint.

The NLA module may also be provided with the DNS suffix from the Network Name and/or Domain Name options in the signed DHCP responses and the value of the Public Location flag (1 bit) from the signed DHCP response.

For example, this information may be passed by the DHCP module to the NLA module by giving the NLA module access to the entire certificate chain and the DHCP host parameters.

The client may use a combination of all or some of the following data items to identify the access network:
  The root public key in the certificate chain. If the chain is just a self-signed certificate, this is the server public key.
  The location identifier from the Network Name or Domain Name option, after it has been checked to match the fully qualified server name (FQDN) specified in the server certificate. The matching may be done by checking that the location identifier is a suffix of the FQDN.
  A flag indicating whether the server certificate specifies "Network Location Authentication" as an application constraint.
  The value of the Public Location flag (1 bit) from the signed DHCP response.
  Any other data from the DHCP response or other clues.

The above data items may be hashed with a cryptographic hash function to produce a more concise network identifier. The value of a network identifier computed in this way is that if any of the input data items changes, the network identifier will change and, thus, the network will be treated as a new one.

The client may use the data items listed above or the network identifier computed from them as a database key for storing network and communications settings in box 303 of FIG. 3 and in box 603 of FIG. 6. The client may also use the data items or the network identifier computed from them to retrieve stored communication and network settings in box 405 of FIG. 4, box 504 of FIG. 5, and box 709 of FIG. 7.

Interoperability with legacy DHCP servers and clients is thus straightforward. For example, if the server does not recognize the Nonce option, it will ignore the option and send the response without the signature. The client then processes the response as usual. The only difference between signed and unsigned DHCP responses is the information that NLA uses for identifying the network. When NLA observes that the DHCP server does not support the security protocol, it calculates the network identifier in the old way, based on information such as the gateway MAC address. A client that does not recognize the Signature option, will not send a Nonce option and, thus, will never receive a Signature option.

Exemplary Computing-Based Device

Figure 13:
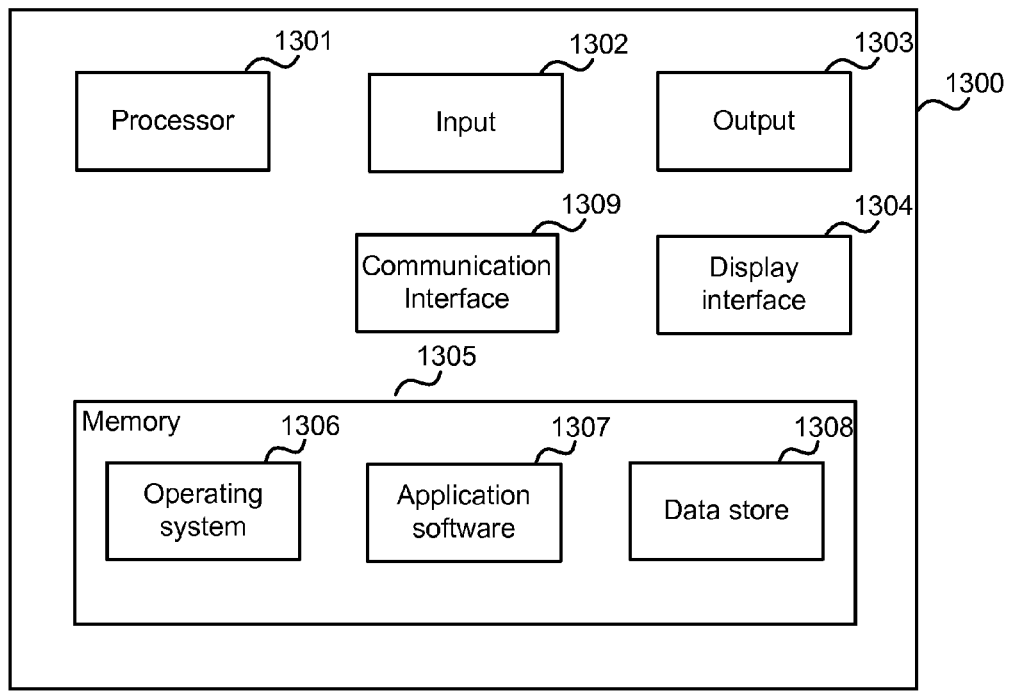
FIG. 13 illustrates an exemplary computing-based device in which embodiments of a network location awareness engine may be implemented.

FIG. 13 illustrates various components of an exemplary computing-based device 1300 which may be implemented as any form of a computing and/or electronic device, and in which embodiments of either a client or an access node may be implemented.

The computing-based device 1300 comprises one or more inputs 1302 which are of any suitable type for receiving media content, Internet Protocol (IP) input, DHCP messages etc. The device also comprises communication interface 1309 arranged to enable communication between the computing-based device and either of a client or an access node, using a communications protocol of any suitable type such as DHCP, improved DHCP as described herein or another communications protocol for establishing a connection between a client and an access node.

Computing-based device 1300 also comprises one or more processors 1301 which may be microprocessors, controllers or any other suitable type of processors for processing computing executable instructions to control the operation of the device in order to provide secure network location awareness. Platform software comprising an operating system 1306 or any other suitable platform software may be provided at the computing-based device to enable application software 1307 to be executed on the device.

The computer executable instructions may be provided using any computer-readable media, such as memory 1305. The memory is of any suitable type such as random access memory (RAM), a disk storage device of any type such as a magnetic or optical storage device, a hard disk drive, or a CD, DVD or other disc drive. Flash memory, EPROM or EEPROM may also be used.

An output 1302 is also provided such as an audio and/or video output to a display system integral with or in communication with the computing-based device. The display system may provide a graphical user interface, or other user interface of any suitable type although this is not essential.

Conclusion

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a storage medium. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A client system comprising:
one or more processors configured to generate a first nonce used as a first freshness indicator;
an output device circuitry configured to send a network request to an access node of a communications network, the access node being certified by a common root certification authority, the request containing the first nonce;
a memory configured to store network settings based on information received from at least one other access node different from the access node, the other access node having been certified and bound into one logical network location with the access node by the common root certification authority of the access nodes;
an input device circuitry configured to receive a signed message from the access node of the communications network, the signed message comprising a signature, a location identifier, a public key, and at least a second nonce used as second freshness indicator comprising; and
the one or more processors being further configured to:
parse the signed message to obtain the second nonce, the signature, and the public key;
compare the first nonce with the second nonce;
validate the second nonce based on the comparison of the first nonce and the second nonce;

verify the signature of the signed message using the public key, and allow the client computing device to access the stored network settings for use within the network, in response to a successful validation of the second nonce and a successful verification of the signature.

2. A client computing device as claimed in claim 1 wherein the public key is conveyed as a part of a certificate chain.

3. A client computing device as claimed in claim 2 wherein the certificate chain comprises only a self-signed certificate.

4. A client computing device as claimed in claim 1 wherein the public key is the root public key of a certificate chain and the client computing device is further configured to check that the location identifier matches a name in the certificate chain.

5. A client computing device as claimed in claim 4 wherein the location identifier is a domain name system (DNS) suffix and the client computing device is configured to check that the location identifier is a suffix of a fully-qualified domain name of the access node, that fully-qualified domain name being provided in the certificate chain.

6. A client computing device as claimed in claim 1 wherein the sent first freshness indicator comprising a first nonce comprises a random number or a pseudo-random number.

7. A client computing device as claimed in claim 1 wherein the client computing device is configured to access the stored settings using a hash of at least the public key and the location identifier.

8. A client computing device as claimed in claim 1, wherein the client computing device is configured to select settings for use with the access node during a current connection, wherein the settings were acquired during a connection prior to the current connection, and storing information about the selected settings together with information about a public key advertised by the access node.

9. A client computing device as claimed in claim 8 wherein the client computing device is further configured to store information about the selected settings together with information about the public key and information about a location identifier provided by the access node.

10. A method of granting access for a client commuting device, the method comprising:

generating, by one or more hardware processors, a first nonce used as a first freshness indicator;

sending, by an output device circuitry, a network request to an access node of a communications network, the access node being certified by a common root certification authority, the request containing the first nonce;

storing network settings based on information received from at least one other access node different from the access node, the other access node having been certified and bound into one logical network location with the access node by the common root certification authority of the access nodes;

receiving, by an input device circuitry, a signed message form the access node of the communications network, the signed message comprising a signature, a location identifier, a public key, and at least a second nonce used as second freshness indicator;

parsing the signed message to obtain the second nonce, the signature, and the public key;

comparing the first nonce with the second nonce;

validating the second nonce based on the comparison of the first nonce and the second nonce;

verifying the signature of the signed message using the public key, and allowing the client computing device to access the stored network settings for use within the network, in response to a successful validation of the second nonce and a successful verification of the signature.

11. The method as claimed in claim 10, further comprising receiving an authenticated location identifier from the communications network and including the location identifier in input to the cryptographic hash function.

12. The method as claimed in claim 11, further comprising checking that the location identifier matches a name in the certificate chain.

13. One or more computer-readable memory storing computer-readable instructions that, when executed on a processor of a client computing device, configure the processor to perform a series of acts comprising:

generating a first nonce used as a first freshness indicator;

sending, by an output device circuitry, a network request to an access node of a communications network, the access node being certified by a common root certification authority, the request containing the first nonce;

storing network settings based on information received from at least one other access node different from the access node, the other access node having been certified and bound into one logical network location with the access node by the common root certification authority of the access nodes;

receiving, by an input device circuitry, a signed message from the access node of the communications network, the signed message comprising a signature, a location identifier, a public key, and at least a second nonce used as second freshness indicator;

parsing the signed message to obtain the second nonce, the signature, and the public key;

comparing the first nonce with the second nonce;

validating the second nonce based on the comparison of the first nonce and the second nonce;

verifying the signature of the signed message using the public key, and allowing the client computing device to access the stored network settings for use within the network, in response to a successful validation of the second nonce and a successful verification of the signature.

14. The one or more computer-readable memory as claimed in claim 13, the series of acts further comprising receiving an authenticated location identifier from the communications network and including the location identifier in input to the cryptographic hash function.

15. The one or more computer-readable memory as claimed in claim 14, the series of acts further comprising checking that the location identifier matches a name in the certificate chain.

16. The one or more computer-readable memory as claimed in claim 15, the series of acts further comprising checking that the certificate chain comprises only a self-signed certificate.

17. The one or more computer-readable memory as claimed in claim 15, the series of acts further comprising checking that the location identifier is a suffix of a fully qualified domain name, the fully qualified domain name being provided in the certificate chain.

18. The one or more computer-readable memory as claimed in claim 13, the series of acts further comprising receiving a location identifier from the communications network, wherein the location identifier includes a domain name system (DNS) suffix advertised by the server and the other server.

19. The one or more computer-readable memory as claimed in claim 13, wherein the first freshness indicator is a random number.

20. The one or more computer-readable memory as claimed in claim 13, wherein the first freshness indicator is a pseudo-random number.

\* \* \* \* \*